Reissued Dec. 23, 1924. Re. 15,971

UNITED STATES PATENT OFFICE.

WILL N. SHRUM, OF DALLAS, TEXAS, ASSIGNOR, BY MESNE ASSIGNMENTS, TO MODERN CHEMICAL MANUFACTURING COMPANY.

ANTILEAK COMPOSITION.

No Drawing. Original application filed January 16, 1919, Serial No. 271,517. Renewed January 21, 1921, Serial No. 439,053. Original No. 1,383,572, dated July 5, 1921. Application for reissue filed January 27, 1923. Serial No. 615,369.

*To all whom it may concern:*

Be it known that I, WILL N. SHRUM, a citizen of the United States, residing at Dallas, in the county of Dallas and State of Texas, have invented a certain new and useful Improvement in Antileak Compositions, of which the following is a specification.

This invention relates to a preparation for stopping and preventing leaks in radiators, water pipes, boilers and other liquid holding vessels, or containers. While the main object of the invention is to prevent water escaping from leaks already formed, the preparation can be, as in the case of radiators, placed in the water before any leak is detected, and will automatically prevent any leak from showing up by stopping any puncture as soon as it becomes of sufficient size to permit water to enter it.

In testing the composition I have found that considerable care is required to get just the right amount of some of the ingredients, as the proportions employed are as important as the ingredients themselves.

In preparing ten gallons of liquid composition I take one pound of asbestos, one and one-half pounds of dry paper, two gallons of wheat or rice paste, one-half ounce of gum arabic, one-half ounce of English rosin, one-half ounce of safrol, or any similar deodorizing agency, one-fourth ounce of salicylic acid and one-eighth of a pint of denatured or wood alcohol. This last is employed as a solvent, especially for the resin.

With the exception of the safrol, alcohol, and paste, these ingredients are in a dry and finely comminuted state. To the above I add a sufficient amount of water to make up the ten gallons.

To stop or prevent a leak a quantity of the composition is poured into the receptacle in which the leak is to be stopped or prevented. In an automobile radiator for example about one quart of the solution is added to the water already contained in the radiator, which will be possibly from four to five gallons.

As previously stated the proportions of some of the ingredients are very important. If more than the amount of paper or fibrous material is used it will clog, if less is used it will fail to do the work required of it. The resin forms a binder for the paper and asbestos, and the amount used is important. It must be just sufficient to allow the ingredients to remain in a fluid state until they have entered the opening to be stopped, and to cause them to become hard, dry and impervious to water as soon as exposed to the outer air. The proportions mentioned are those that exhaustive tests have proven to be most efficient, and in preparing the solution accurate measurements should be made.

The vegetable pulp used in the composition described is merely a fibrous cellulosic material and paper is a convenient form in which it may be obtained. The gum and the resin are merely binders serving to cement or bind the fibrous and starchy material together, the gum becoming operative first, the resin later as oxidation takes place.

The aqueous mixture consists perhaps of some materials in solution, others in suspension but the term mixture is intended to cover the combination of the ingredients both in solution and suspension.

The operation of my composition in stopping leaks is as follows:

The material in suspension or solution or in mixture with the water or cooling or heat conveying fluid in the radiator passes outwardly through a leak or aperture. Some of the fibrous material catches on the walls of the radiator surrounding the leak and lodges there. This process continues as the liquid flows, until a certain amount of fibrous material is matted by air in the leak, decreasing the flow and gradually stopping it. The other ingredients being thus exposed to the air are subject to some kind of chemical change which results in their holding and binding the fibrous material together into a concrete like mass which finally cements the plug together thus forming a chemical and physical binding to form a plug which ultimately closes the aperture and makes it water or liquid tight.

I claim:

1. A composition for stopping leaks in radiators, boilers, etc., consisting of finely ground paper, one and one-half pounds, comminuted asbestos, one pound, two gallons of a starchy paste, one-half ounce of gum arabic or an equivalent gum, one-half ounce resin, a suitable deodorizer, one-half ounce salicylic acid, and one-eighth of a pint of alcohol, all added to a sufficient amount of water to equal ten gallons.

2. A composition for stopping leaks in automobile radiators, boilers, etc., comprising an aqueous mixture of finely divided fibrous material, a vegetable paste, a resinous binding material, and a preservative.

3. A composition for stopping leaks in automobile radiators, boilers, etc., comprising an aqueous mixture of finely divided paper pulp, a vegetable paste, a resinous binder, and a solvent for the said binder.

4. A composition for stopping leaks in automobile radiators, boilers, etc., comprising an aqueous mixture of finely divided fibrous material, a vegetable paste, a gum serving as a binder, a resinous substance also serving as a binder, and a solvent for the latter.

5. A composition for stopping leaks in automobile radiators, boilers, etc., comprising an aqueous mixture of finely divided paper pulp, a starchy paste, rosin, a solvent for the rosin, and a preservative.

Signed at Dallas, Texas, this 22nd day of Jan. 1923.

WILL N. SHRUM.

Witnesses:

E. L. TRAVIS,

CHAS. W. ULMSTEAD.